US012656590B2

(12) United States Patent (10) Patent No.: US 12,656,590 B2
Nishiura (45) Date of Patent: Jun. 16, 2026

(54) SPECIMEN OBSERVATION APPARATUS AND SPECIMEN OBSERVATION METHOD

(71) Applicant: Hitachi High-Tech Corporation, Tokyo (JP)

(72) Inventor: Kento Nishiura, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 845 days.

(21) Appl. No.: 17/798,623

(22) PCT Filed: Feb. 26, 2020

(86) PCT No.: PCT/JP2020/007741
§ 371 (c)(1),
(2) Date: Aug. 10, 2022

(87) PCT Pub. No.: WO2021/171419
PCT Pub. Date: Sep. 2, 2021

(65) Prior Publication Data
US 2023/0152566 A1 May 18, 2023

(51) Int. Cl.
*G02B 21/06* (2006.01)
*G02B 7/28* (2021.01)
(Continued)

(52) U.S. Cl.
CPC ............. *G02B 21/06* (2013.01); *G02B 7/282* (2013.01); *G02B 21/248* (2013.01); *G02B 21/26* (2013.01); *G02B 21/34* (2013.01)

(58) Field of Classification Search
CPC ............................ G02B 21/00; G02B 21/0004; G02B 21/0012; G02B 21/0016; G02B 21/002;
(Continued)

(56) References Cited

U.S. PATENT DOCUMENTS 6,542,293 B2 * 4/2003 Yahiro .................. B01L 3/5085
250/201.3
9,360,659 B2 * 6/2016 Stauffer ............... G02B 21/241
(Continued)

FOREIGN PATENT DOCUMENTS

JP 2011-047695 A 3/2011
JP 2015-227940 A 12/2015
(Continued)

OTHER PUBLICATIONS

International Search Report, PCT/JP2020/007741, May 19, 2020, 2 pgs.

*Primary Examiner* — Thong Q Nguyen
(74) *Attorney, Agent, or Firm* — Volpe Koenig

(57) ABSTRACT

The present invention provides a technology whereby relative positioning in the horizontal direction between a specimen observation area in a specimen container and an imaging field of view can be reliably performed, even prior to adjusting the focal position in the vertical direction using an auto-focus system. This specimen observation apparatus: obtains a luminance value for an image at a plurality of locations in the specimen container, prior to performing auto-focus; and uses the number of high-luminance regions and the width of those regions and identifies a central position, in the horizontal direction, in the specimen container or uses the number of low-luminance regions and the width of those regions and identifies the central position, in the horizontal direction, in the specimen container.

15 Claims, 20 Drawing Sheets

(51) Int. Cl.

| | | |
|---|---|---|
| *G02B 21/24* | (2006.01) |
| *G02B 21/26* | (2006.01) |
| *G02B 21/34* | (2006.01) |
| *G02B 21/00* | (2006.01) |

(58) Field of Classification Search
CPC ............ G02B 21/0024; G02B 21/0028; G02B
21/0032; G02B 21/0036; G02B 21/0052;
G02B 21/006; G02B 21/008; G02B
21/0088; G02B 21/02; G02B 21/06;
G02B 21/24; G02B 21/241; G02B
21/244; G02B 21/26; G02B 21/34; G02B
21/36; G02B 21/361; G02B 21/365
USPC ................................................ 359/368–398
See application file for complete search history.

(56) References Cited

U.S. PATENT DOCUMENTS

| | | | |
|---|---|---|---|
| 2007/0008536 A1 | 1/2007 | Mitani et al. |
| 2008/0297774 A1 | 12/2008 | Jiang |
| 2015/0168212 A1 | 6/2015 | Yamaguchi |
| 2019/0310454 A1 | 10/2019 | Shimada |

FOREIGN PATENT DOCUMENTS

| | | | |
|---|---|---|---|
| JP | 2019-184684 A | 10/2019 |
| WO | 2005/088280 A1 | 9/2005 |
| WO | 2014/020967 A1 | 2/2014 |

* cited by examiner

[WELL CROSS-SECTIONAL SHAPE]

WELL BOTTOM SURFACE

WELL OUTER BOTTOM SURFACE

[TRANSMITTED LIGHT DISTRIBUTION]

FIG. 9A

SPECIMEN OBSERVATION APPARATUS AND SPECIMEN OBSERVATION METHOD

TECHNICAL FIELD

The disclosure relates to a specimen observation apparatus that observes a specimen contained in a specimen container.

BACKGROUND ART

In a specimen observation apparatus that images a specimen contained in a specimen container, to accurately observe the specimen, it is useful to reliably image the specimen by determining a specimen observation area in the specimen container or a specimen position in the specimen container. This is because correct information on the specimen cannot be obtained if the specimen is not included in the captured image.

The following PTL 1 discloses a specimen observation apparatus. In PTL 1, cells to be measured are detected using captured images of a plurality of wide viewing angles bonded in a tile shape (see 0113 in PTL 1). For example, an apparatus that captures a microscope image of a specimen contained in a specimen container, including a well-like specimen containing portion, determines a relative position in the horizontal direction between a specimen observation area in the specimen container and an imaging field of view, and automatically performs focus adjustment and imaging. In such a specimen observation apparatus, when an observation image is obtained according to a preset imaging position, the specimen observation area and the imaging field of view may be deviated from each other. The specimen container, which is a consumable product, is generally a resin molded product and has a manufacturing error larger than that of a machined product. Therefore, it is difficult to completely eliminate positional deviation caused by the manufacturing error of the specimen container, no matter how accurately an apparatus mechanism holds the specimen container. These deviations lead to a decrease in accuracy of the captured image and a decrease in an amount of information. Also, these deviations may lead to erroneous determination during post-processing, such as image observation and image analysis. In addition, if the deviation is large, the deviation may be excluded from determination targets of focus adjustment, and thus imaging may become impossible. For example, in a laser auto-focus system, focus adjustment cannot be performed when a laser irradiation position is out of a specimen observation area.

CITATION LIST

Patent Literature

PTL 1: JP-A-2015-227940

SUMMARY OF INVENTION

Technical Problem

The above problems include deviation, focus adjustments, etc.

The disclosure has been made to solve the above problems, and an object thereof is to provide a technology whereby relative positioning in the horizontal direction between a specimen observation area in a specimen container and an imaging field of view can be reliably performed, even prior to adjusting the focal position in the vertical direction using an auto-focus system.

Solution to the Problems

A specimen observation apparatus according to the disclosure obtains a luminance value for an image at a plurality of locations in a specimen container, prior to performing auto-focus, and uses the number of high-luminance regions and the widths of those regions to identify a central position of the specimen container in a horizontal direction, or uses the number of low-luminance regions and the widths of those regions to identify the central position of the specimen container in the horizontal direction.

Advantageous Effects of Invention

According to the specimen observation apparatus of the disclosure, the relative positioning in the horizontal direction between the specimen observation area in the specimen container and the imaging field of view can be reliably performed, even prior to adjusting the focal position in the vertical direction using an auto-focus system.

BRIEF DESCRIPTION OF DRAWINGS

FIG. 9A is a diagram showing a state in which the controller 200 moves the imaging field of view by $\Delta Y$ in a Y direction in step S604.

DESCRIPTION OF EMBODIMENTS

Embodiment 1

Figure 1:
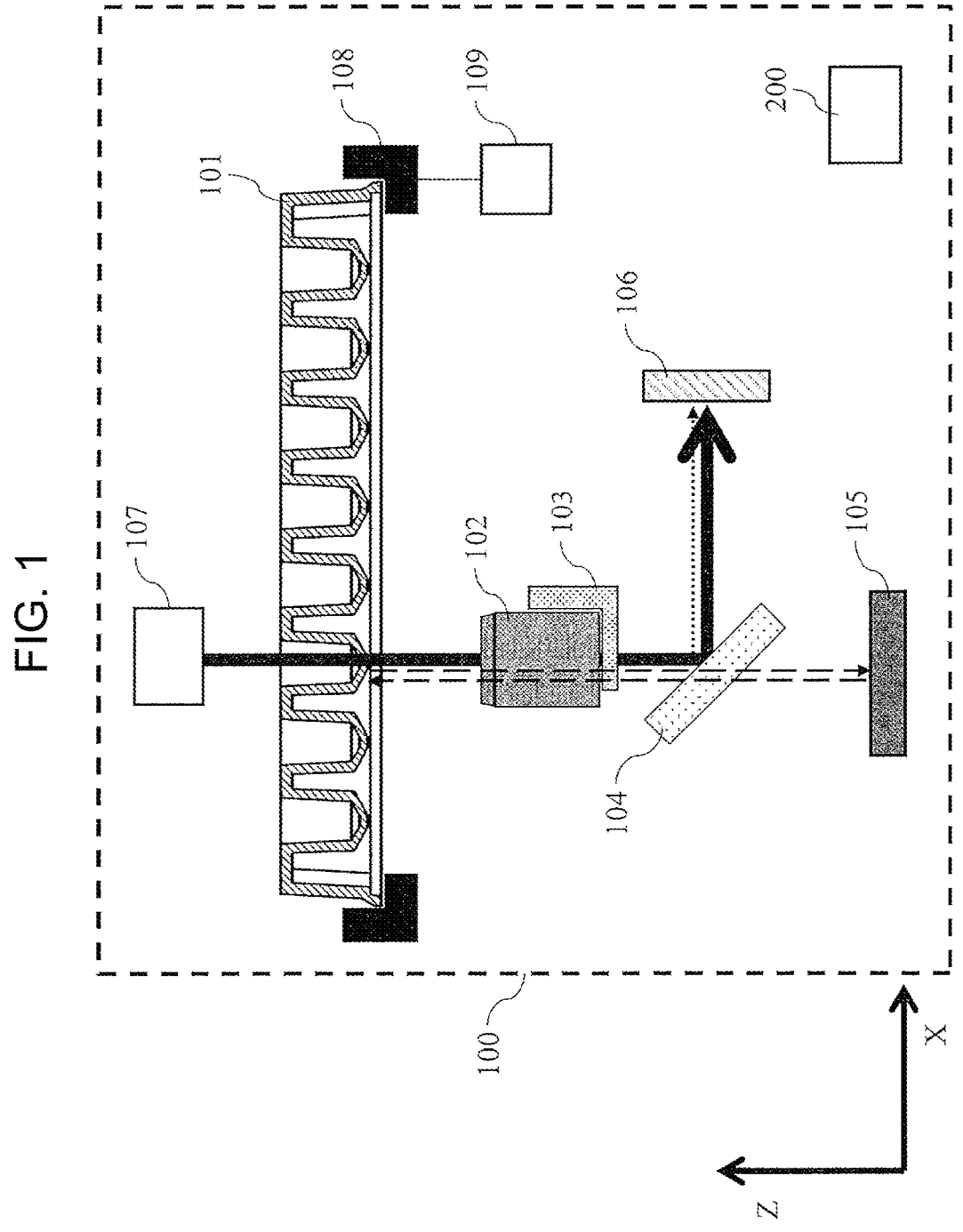
FIG. 1 is a configuration diagram of a specimen observation apparatus 100 according to Embodiment 1.

FIG. 1 is a configuration diagram of a specimen observation apparatus 100 according to Embodiment 1 of the disclosure. The specimen observation apparatus 100 is an apparatus that observes a specimen by obtaining an image of the specimen contained in a specimen container 101. The specimen observation apparatus 100 includes an objective lens 102, an objective lens actuator 103, a dichroic mirror 104, an optical pickup 105, an imaging element 106, an illumination 107 (light source), a specimen container holder 108, an XY stage 109, and a controller 200. The controller 200 controls each unit provided in the specimen observation apparatus 100.

The specimen container holder 108 holds one or more specimen containers 101. Although each specimen container 101 in FIG. 1 is assumed to be a multi-well plate, the type of the container is not limited thereto. The container may have any shape, as long as the shape has one or more specimens containing portions, and a determination method to be described later can be applied thereto. Hereinafter, a well of the multi-well plate corresponds to the specimen containing portion, and a well bottom surface is a specimen observation area, which is a target to be imaged.

The specimen container holder 108 is connected to the XY stage 109. The XY stage 109 is a drive mechanism capable of moving the specimen container holder 108 in an X direction and a Y direction (two directions along the horizontal direction). Since an imaging field of view and the specimen container 101 may move relative to each other, an imaging system including the objective lens 102 and the imaging element 106 may move instead of moving the specimen container holder 108. In the operation schematic diagram used in Embodiment 1, for convenience of description, the imaging field of view is shown as moving relative to the position of the fixed specimen container 101. The imaging element 106 has 5 million pixels (2500×2000).

After a user of the apparatus or another automatic transport apparatus places the specimen container 101 on the specimen container holder 108, the controller 200 performs an imaging operation. The controller 200 drives the XY stage 109 to adjust the position of the specimen container holder 108 in the X direction and the Y direction, aligns the imaging field of view with the well bottom surface, and positions a focal point of the objective lens 102 in the vicinity of the well bottom surface by the objective lens actuator 103 that is driven in a Z direction. By the above procedure, an image of the well bottom surface can be obtained.

The optical pickup 105 is incorporated with a laser diode and a photodiode. The optical pickup 105 drives the objective lens actuator 103 such that the focal point of the objective lens 102 is positioned in the vicinity of the well bottom surface when the photodiode in the optical pickup 105 detects reflected light of laser irradiated to the well bottom surface. As a result, the optical pickup 105 and the objective lens actuator 103 operate as an auto-focus mechanism of the objective lens 102. Since auto-focus cannot be performed unless an XY position of the imaging field of view is aligned with the well bottom surface, an image that can be captured before auto-focus is executed is defocused, in principle. The auto-focus method is not limited to a method using the laser, and may also be a method of evaluating image contrast or a method using a phase difference. It is assumed that a height of the specimen in the Z direction is about several microns, and a target position of the auto-focus is on the well bottom surface or above the well bottom surface by several microns.

Figure 2:
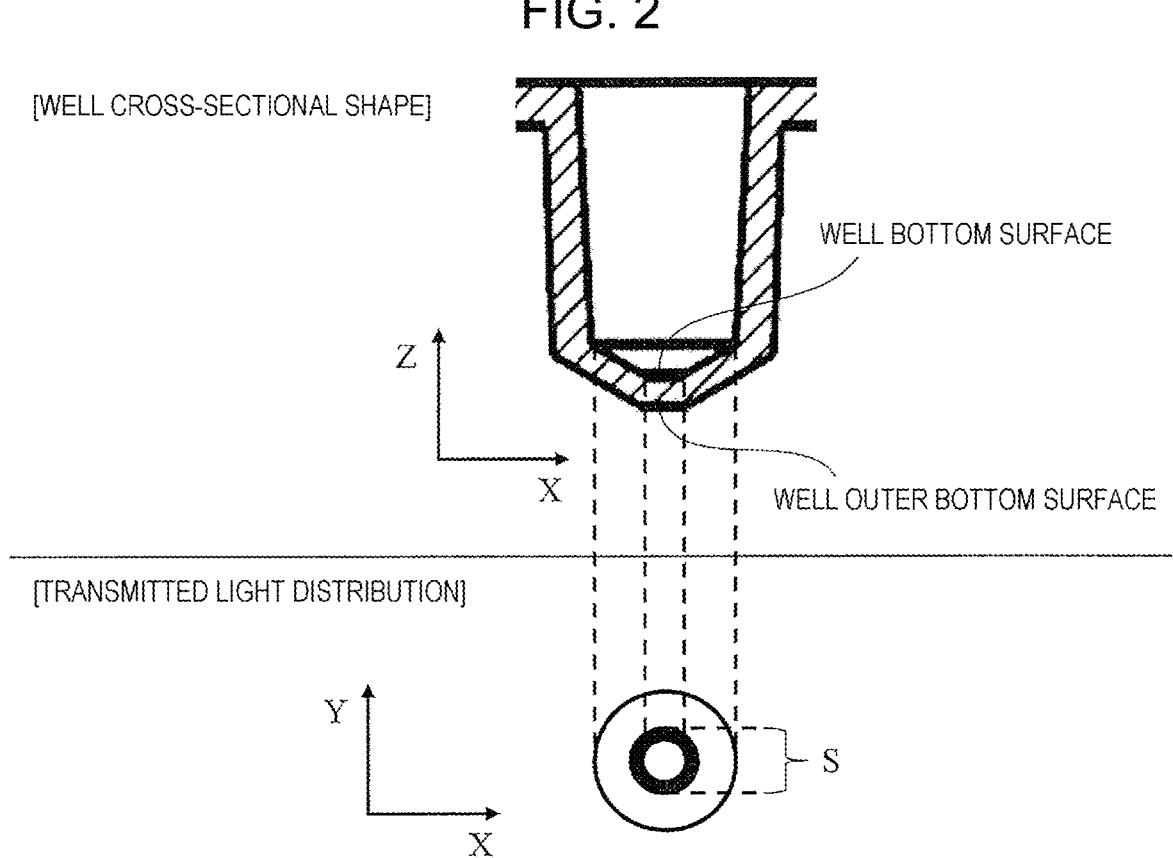
FIG. 2 is an example of a shape of a specimen containing portion of a specimen container 101.

FIG. 2 is an example of a shape of the specimen containing portion of the specimen container 101. An upper part of FIG. 2 is a side cross-sectional view of the specimen container 101. A lower part of FIG. 2 shows a distribution of illumination transmitted light from above the specimen container 101. The specimen container 101 includes an inclined portion such that a planar region perpendicular to an optical axis (hereinafter, this region is referred to as the well bottom surface or the bottom surface) is surrounded. Transmitted light is reduced by refraction at a boundary between the well bottom surface portion and the inclined portion. As a result, an annular low-luminance region S is generated.

Figure 3:
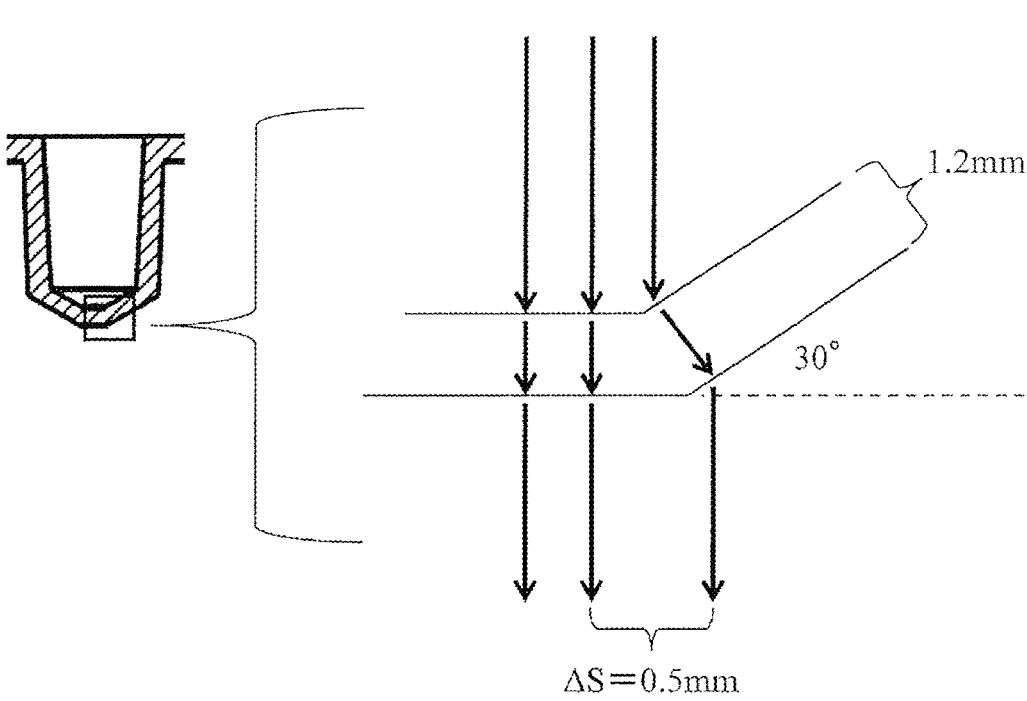
FIG. 3 is a diagram illustrating refraction of light in the vicinity of an inclined portion of the specimen container 101.

FIG. 3 is a diagram illustrating refraction of light in the vicinity of the inclined portion of the specimen container 101. When an inclination angle of the inclined portion is 30 degrees and a thickness of the bottom surface is 1.2 mm, a deviation ($\Delta$S) of 0.5 mm occurs due to refraction of light at the inclined portion. A diameter of the annular low-luminance region S (e.g., a diameter of the well bottom surface) is +2×0.5 mm. This numerical example is a calculated value based on an actual object. This numerical example may be slightly different from a dimension in an actual defocused image.

Figure 4:
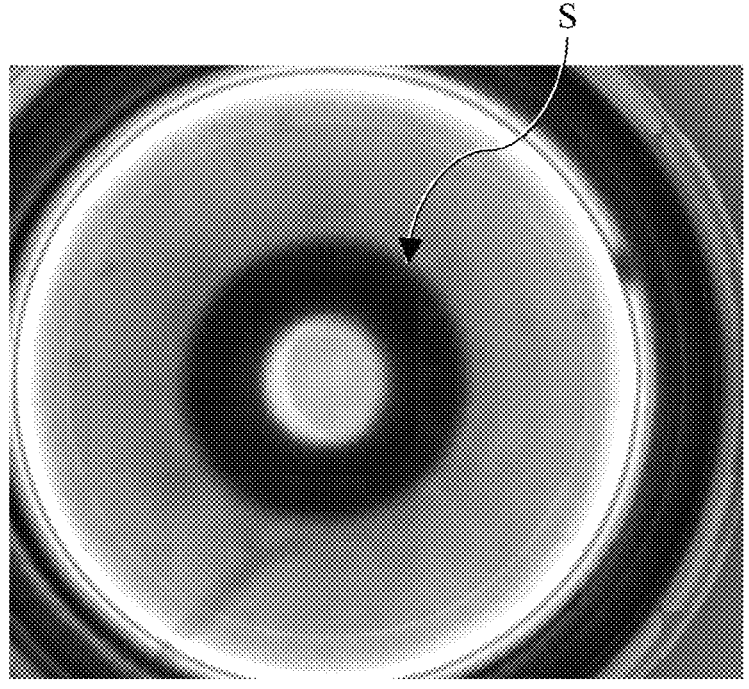
FIG. 4 is an example of a defocused image in a case where a periphery of the specimen container 101 is actually imaged at a wide viewing angle.

FIG. 4 is an example of the defocused image in a case where a periphery of the specimen container 101 is actually imaged at a wide viewing angle. The annular low-luminance region S can be visually recognized. The low-luminance region S corresponds to a refracted light image obtained by imaging light refracted by the inclined portion.

Figure 5:
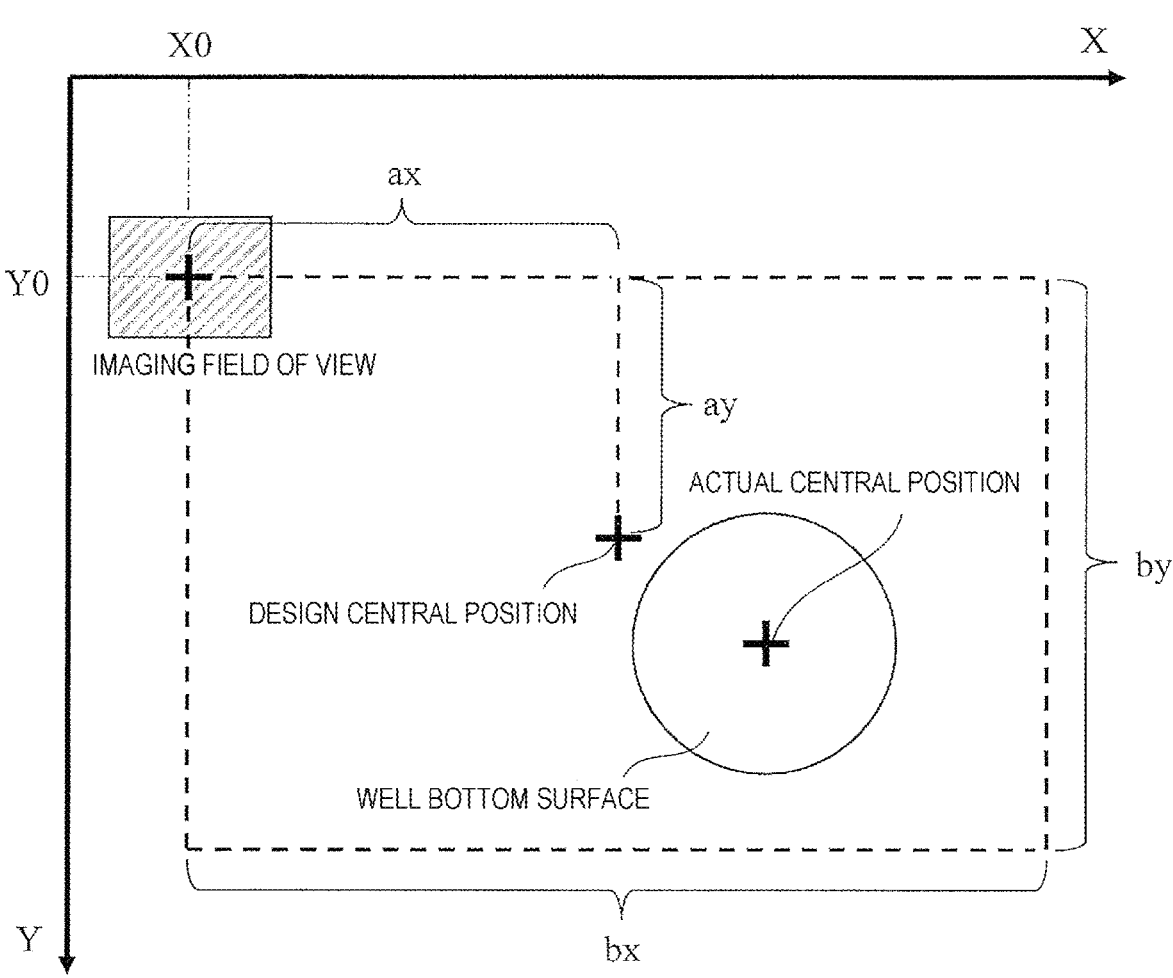
FIG. 5 is a schematic diagram showing a state in which a design value of a central position of a bottom surface of the specimen container 101 is different from an actual value.

FIG. 5 is a schematic diagram showing a state in which a design value of a central position of a bottom surface of the specimen container 101 is different from an actual value. In a manufacturing stage of the specimen observation apparatus 100, coordinates are defined. In a coordinate system of the XY stage 109, coordinates (X0+ax, Y0+ay) are set such that a center of the imaging field of view coincides with a design central position of each well. When a position at which a distance between the design central position and the center of the imaging field of view is (ax, ay) is defined as an operation start point, XY stage coordinates of the operation start point are (X0, Y0). An operation region (X0+bx, Y0+by) is set so as to include at least an actual central position of the well. Specifically, when a design value of the diameter of the well bottom surface is 1.5 mm and the design central position of the well is (X0+ax±1 mm, Y0+ay±1 mm), values of ax and ay should be about 1 mm+(a radius of the well bottom surface)=1.75 mm.

An actual operation of the apparatus will be described. First, a focal position of the objective lens 102 is moved above the well bottom surface, such that a defocused image of the well bottom surface can be reliably obtained. Alternatively, the apparatus is set in advance such that the focal position of the objective lens 102 is located above the well bottom surface in a state in which the auto-focus is not performed (e.g., at an origin of the objective lens actuator 103). Although the actual central position of the well can be subjected to image determination even if a captured image is an in-focus image, erroneous determination may occur due to an influence of minute damage on the well bottom surface or the like. Therefore, in Embodiment 1, the actual central position of the well is determined using the defocused image.

The XY stage 109 moves the imaging field of view within the operation region (X0+bx, Y0+by) with the operation start point (X0, Y0) serving as a start point. The imaging element 106 performs imaging at regular intervals and obtains images of the whole or a part of the imaging field of view. A series of operations of obtaining the images at regular intervals while driving the XY stage 109 is referred to as scanning.

The operation of the XY stage 109 may or may not be stopped during exposure. In the case of not stopping, to prevent image blur, it is desirable that a time for moving over a distance corresponding to one pixel is shorter than an exposure time for obtaining the image. As a specific example, when the exposure time is 500 s and pixel resolution is 0.345 m/pixel, it is considered that no image blur will occur if a moving speed of the XY stage 109 is 0.69 mm/s or less. However, in Embodiment 1, since the well central position is identified by the defocused image, there is a high possibility that image blur of several pixels will not cause any problem.

The controller 200 analyzes information on a luminance value of the obtained image (hereinafter, referred to as image information) to derive XY stage coordinates that allow the actual well central position and the center of the imaging field of view to coincide with each other. A specific procedure will be described later. The term "image information" as used herein refers to coordinates where the image is obtained, a sum of luminance values in the image, an average of the luminance values, a mode value of the luminance values, and the like.

Figure 6:
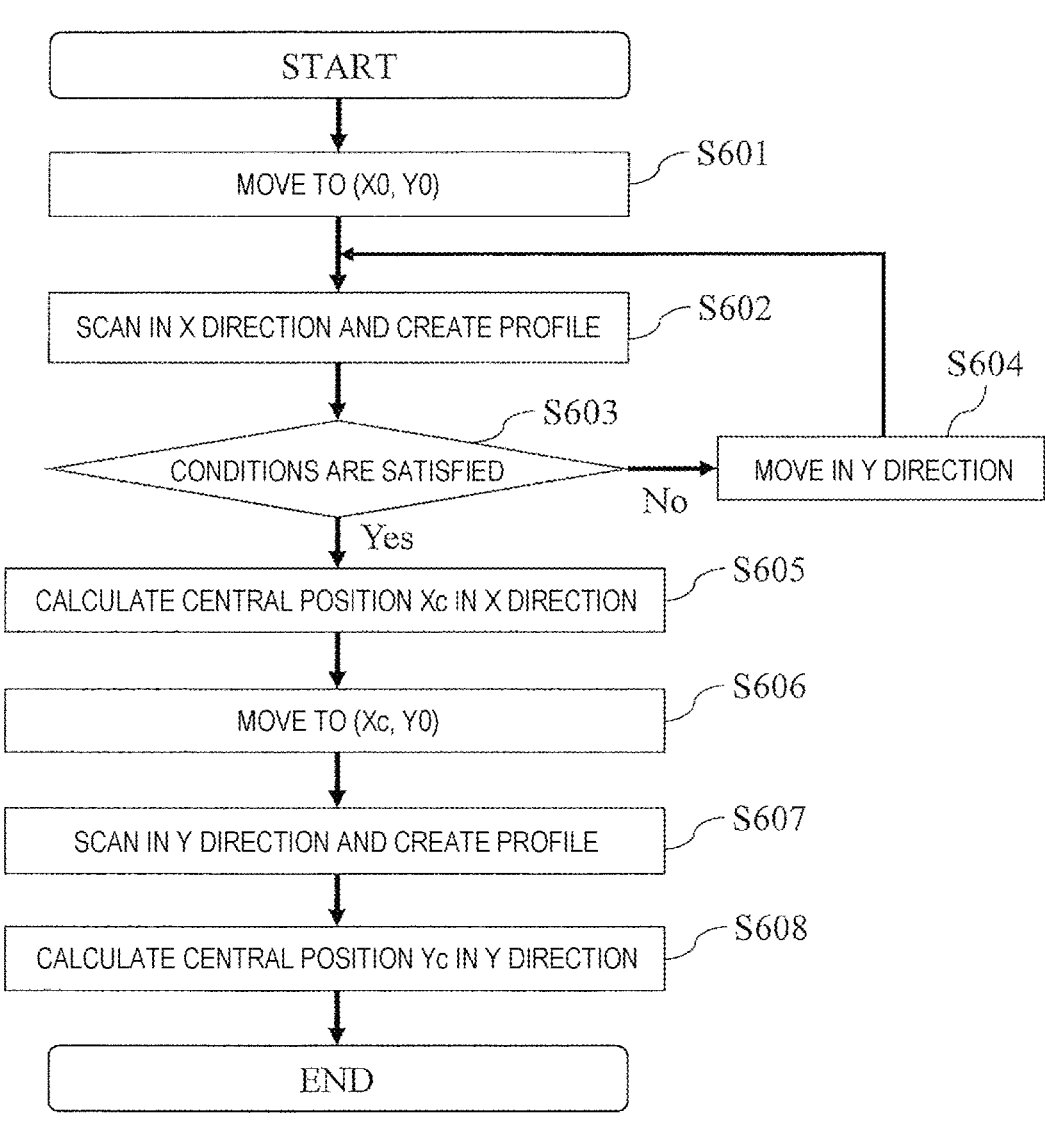
FIG. 6 is a flowchart illustrating a procedure of identifying an actual well central position.

FIG. 6 is a flowchart illustrating a procedure of identifying the actual well central position. In Embodiment 1, the actual well central position is identified using the fact that the well bottom surface is a region surrounded by the low-luminance region S. An image obtained during scanning is a part of the imaging field of view (for example, a square image of 900 pixels). This image is referred to as a partial image. Although the partial image may be captured at any part of all the pixels of the imaging element 106, the partial image is assumed to be a central part of the imaging element here. In this flowchart, coordinates and a sum of luminance values are used as the image information. Hereinafter, each step of FIG. 6 will be described.

(FIG. 6: Step S601)

Figure 7:
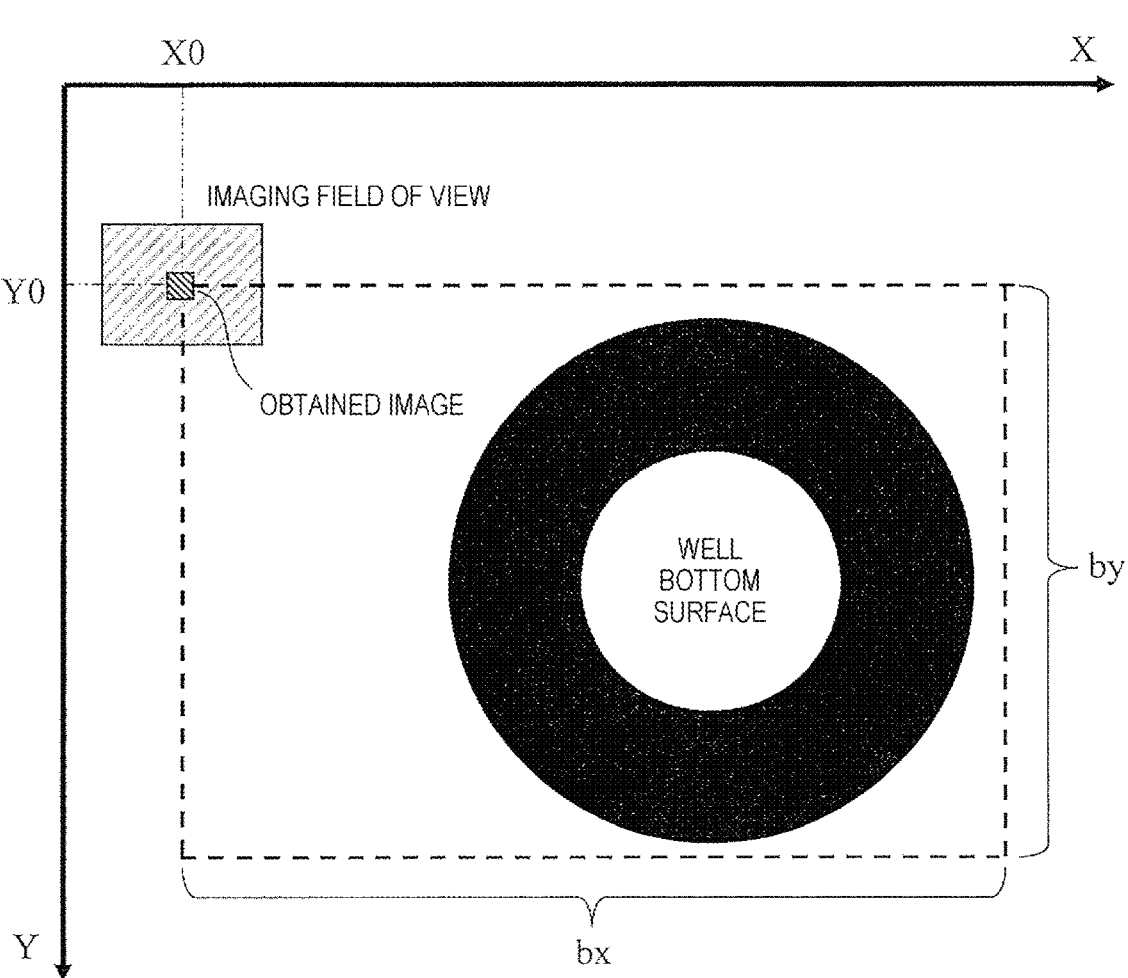
FIG. 7 is a diagram showing a positional relationship when a controller 200 obtains an observation image in step S601.

The controller 200 sets the center of the imaging field of view to the operation start point (X0, Y0). A planar image of this step is shown in FIG. 7, which is described herein.

(FIG. 6: Step S602)

Figure 8A:
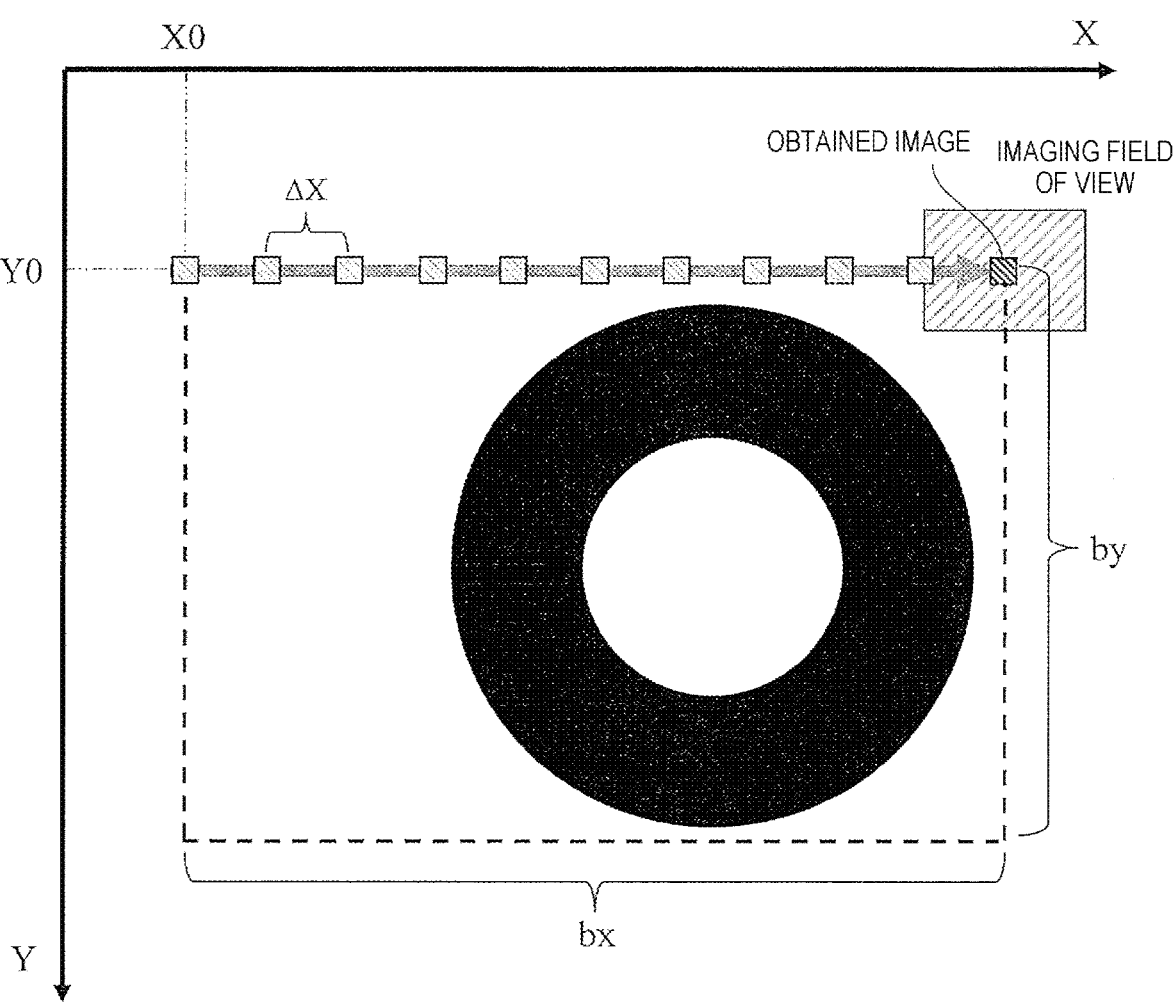
FIG. 8A is a diagram showing a state in which an imaging field of view is moved by bx in an X direction in step S602.

The controller 200 moves the imaging field of view by bx along a scanning line in the X direction. That is, the center of the imaging field of view is moved from (X0, Y0) to (X0+bx, Y0). A planar image after the movement is shown in FIG. 8A to be described later. While the imaging field of view is moved, the controller 200 obtains the partial image for N times at an interval ΔX. The controller 200 stores the obtained partial image in a memory, analyzes the partial image immediately, and calculates a sum of luminance values of all pixels (here, 900 pixels) in the partial image. The controller 200 stores, in the memory, a correlation (referred to as a profile) between the sum of the luminance values and coordinates where the partial image is obtained.

(FIG. 6: Step S603)

Figure 10A:
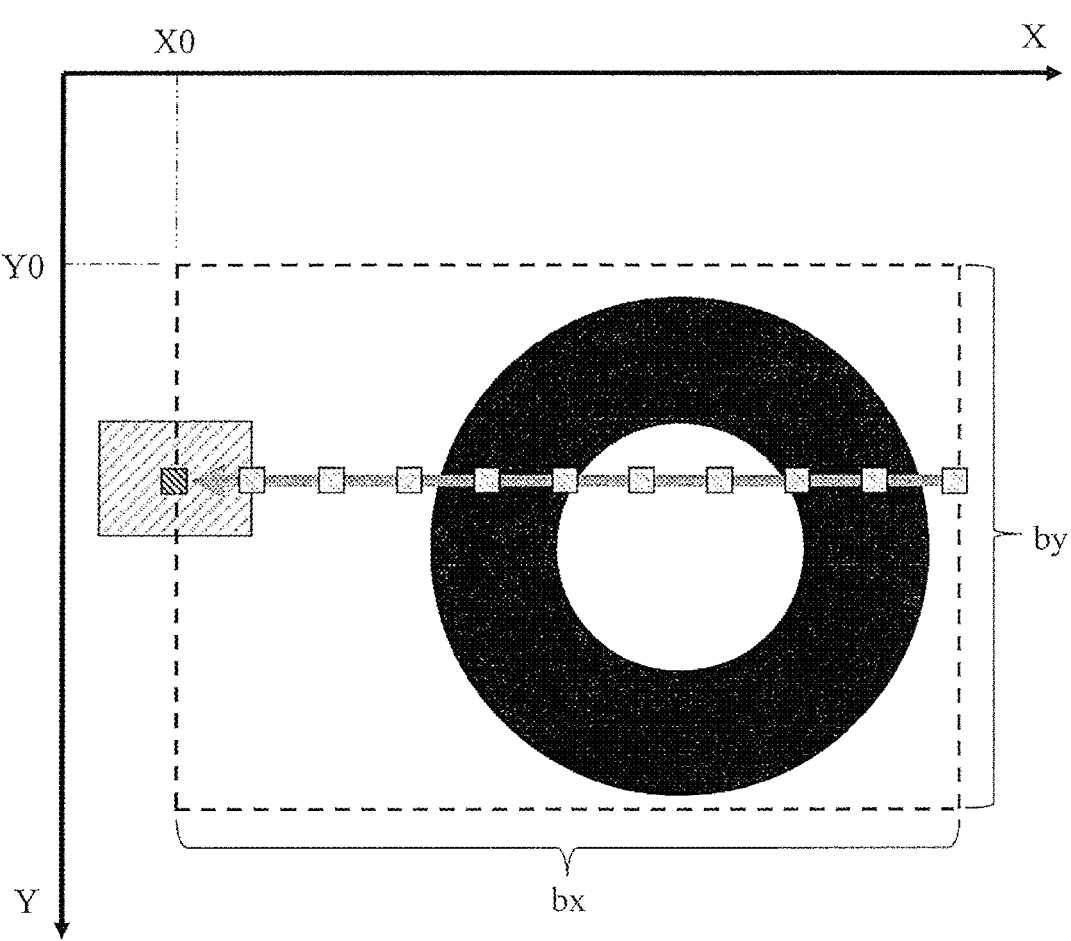
FIG. 10A is an example of a scanning line satisfying conditions (1) and (2).

The controller 200 analyzes the profile obtained in S602 and determines whether the following two conditions are satisfied. However, condition (2) is determined only for a profile that satisfies condition (1). An example of a planar image in a case where the conditions are satisfied is shown in FIG. 10A to be described later together with significance of each condition. When the conditions are satisfied, the process proceeds to S605, and when the conditions are not satisfied, the process proceeds to S604.

Condition (1): in the profile, there are two or more low-luminance regions below a determination threshold value.

Condition (2): in the profile, a width ΔH of a high-luminance region interposed between the two low-luminance regions is within a set allowable range.

(FIG. 6: Step S604)

Figure 9A:
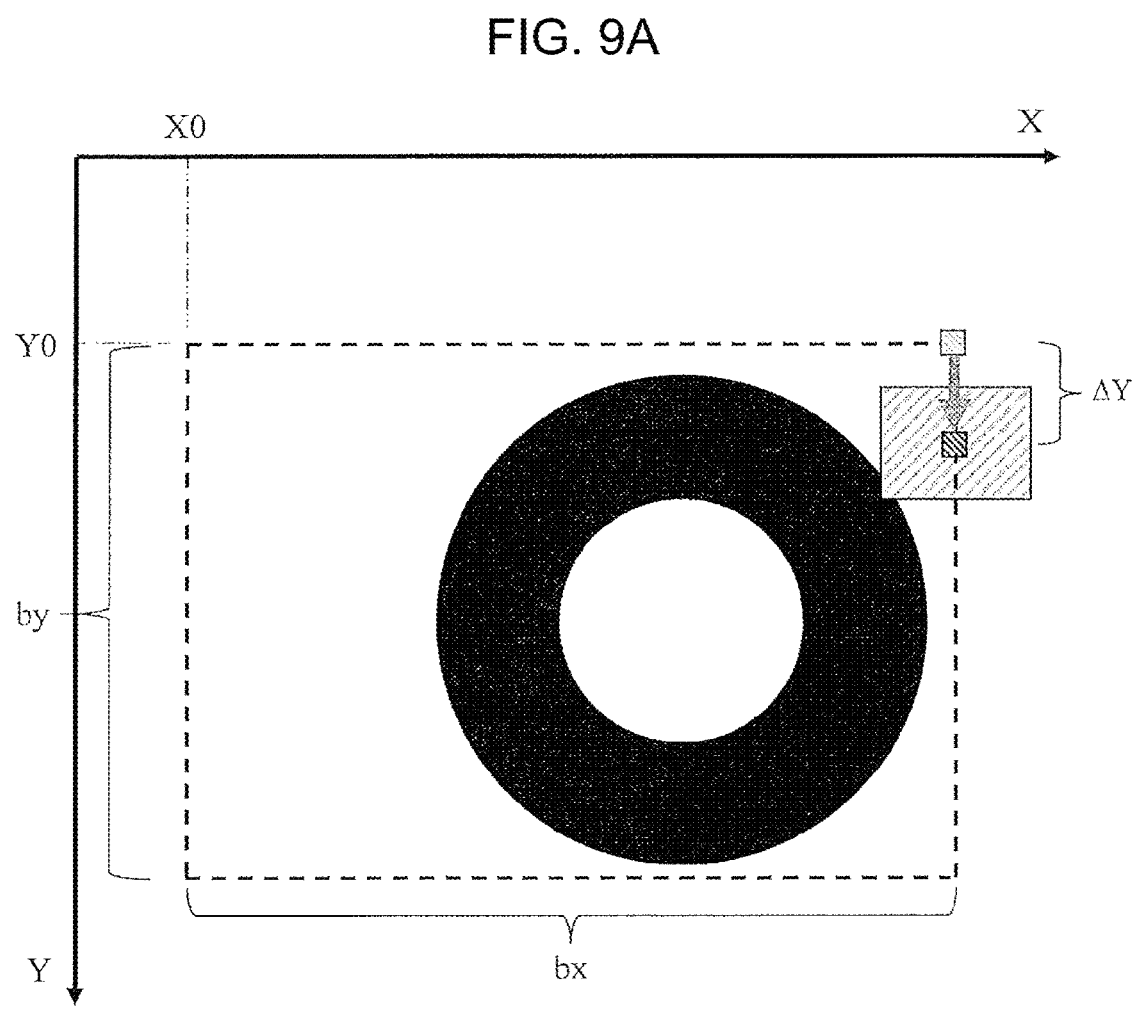
Figure 9B:
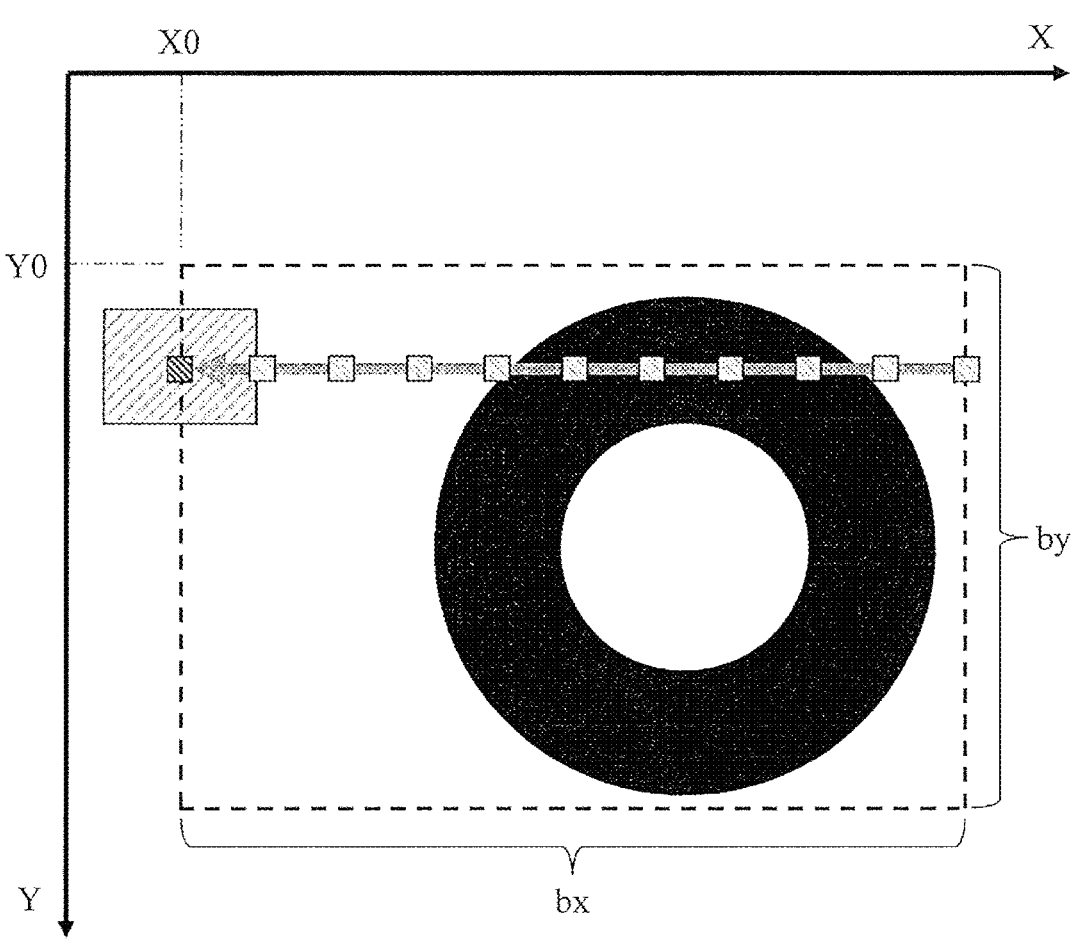
FIG. 9B is a diagram showing a state in which S602 is performed following FIG. 9A.

The controller 200 moves the imaging field of view in the Y direction by ΔY, returns to S602, and repeats the same process. To shorten the scanning time, it is desirable to alternately switch a scanning direction between a +X direction and a −X direction each time S602 is performed. An example of scanning in the −X direction is shown in FIG. 9B to be described later.

(FIG. 6: Step S605)

Figure 11:
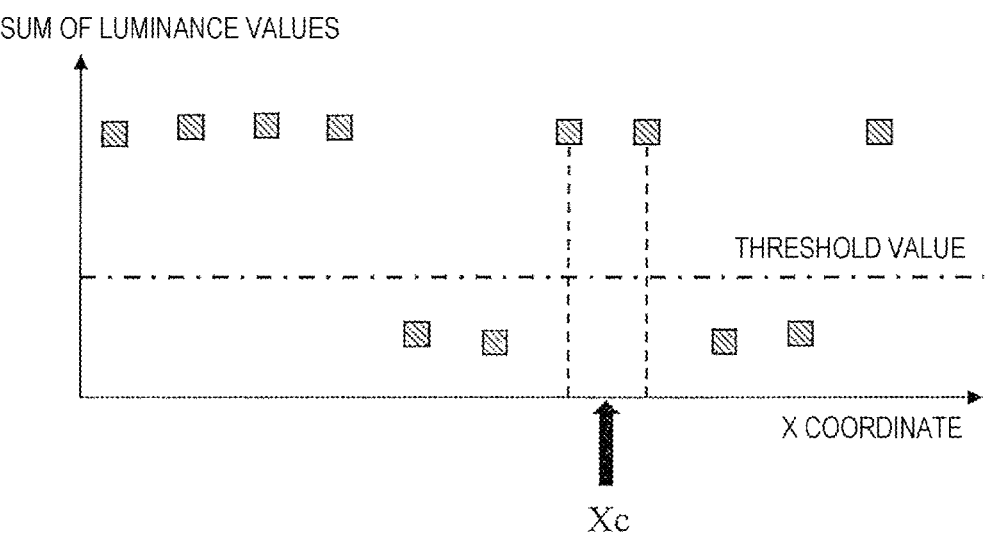
FIG. 11 is a diagram showing a state in which the controller 200 obtains a coordinate Xc of an actual center in step S605.

The controller 200 sets a center of the width ΔH of the high-luminance region interposed between the two low-luminance regions as a coordinate Xc of an actual center of the well in the X direction. Xc corresponds to an average value of X coordinate points in the high-luminance region. A specific example of this step is shown in FIG. 11, which is described herein.

(FIG. 6: Steps S606 to S608)

Figure 12A:
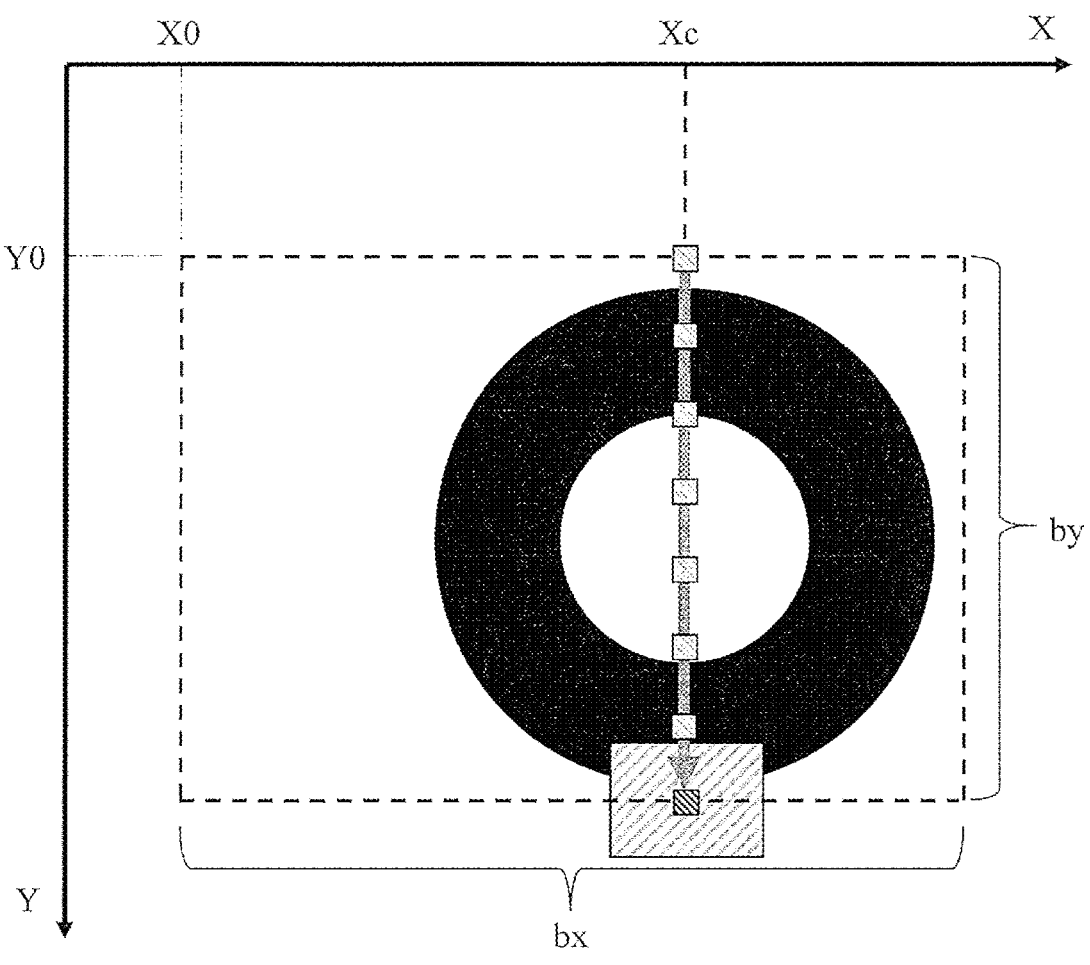
FIG. 12A is a diagram showing a state in which a profile is obtained along a scanning line in the Y direction in S607.
Figure 12B:
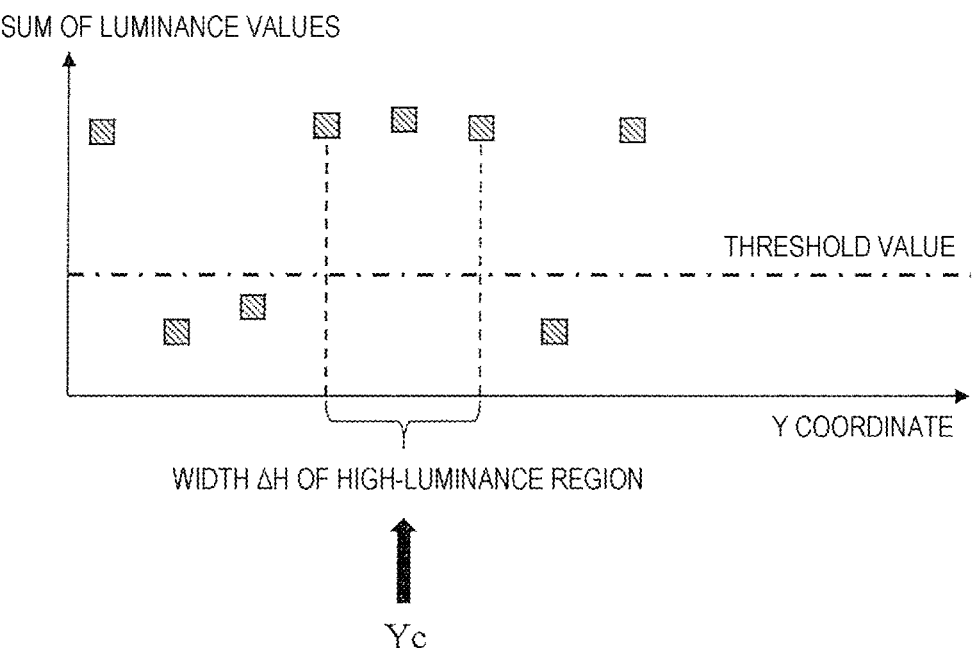
FIG. 12B is an example of the profile obtained in FIG. 12A.

The controller 200 moves the imaging field of view to (Xc, Y0) (S606). In the same manner as S602, the controller 200 obtains a profile by moving the imaging field of view along a scanning line in the Y direction (S607). In the same manner as S605, the controller 200 sets the center of the width ΔH of the high-luminance region interposed between the two low-luminance regions as a coordinate Yc of the actual center of the well in the Y direction (S608). An example of a state in which S606 to S608 are performed is shown in FIGS. 12A and 12B, which are described herein.

According to this flowchart, the actual central position and the center of the imaging field of view can coincide with each other. After this flowchart is performed, the controller 200 executes an auto-focus and images the specimen via the imaging element 106. The obtained image is used for observation and analysis of the specimen.

FIG. 7 is a diagram showing a positional relationship when the controller 200 obtains an observation image in step S601. The center of the imaging field of view is set to (X0, Y0).

FIG. 8A is a diagram showing a state in which the imaging field of view is moved by bx in the X direction in step S602. In FIG. 8A, partial images are obtained at 11 positions (N=11) including the operation start point.

Figure 8B:
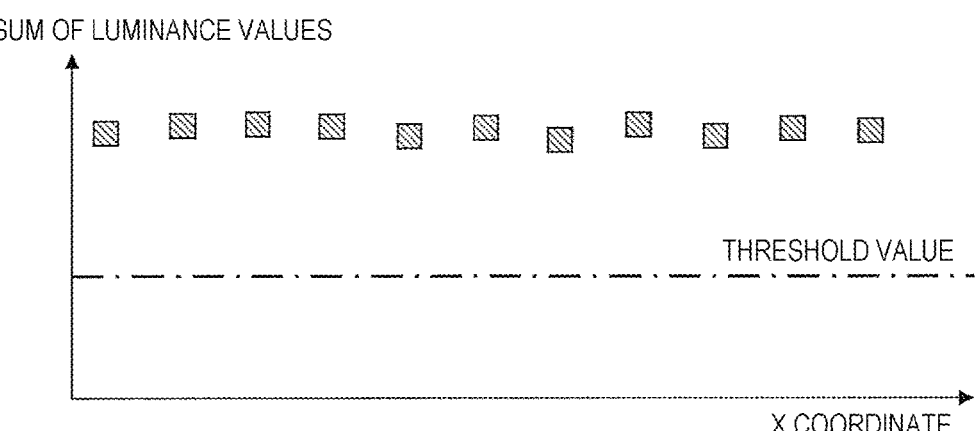
FIG. 8B is a graph showing a sum of luminance values of partial images obtained in FIG. 8A.

FIG. 8B is a graph showing a sum of luminance values of the partial images obtained in FIG. 8A. The vertical axis represents the sum of the luminance values of the partial images, and the horizontal axis represents the X coordinates of the partial images. In FIG. 8A, since all the partial images are obtained at bright regions, the sum of the luminance values of the respective partial images is equal to or higher than the threshold value. It is necessary to set the X coordinate interval ΔX at which the partial images are obtained to be sufficiently small. Specifically, it is desirable to set ΔX to ½ to ⅓ of ΔS (the width of the low-luminance region) or less.

Figure 8C:
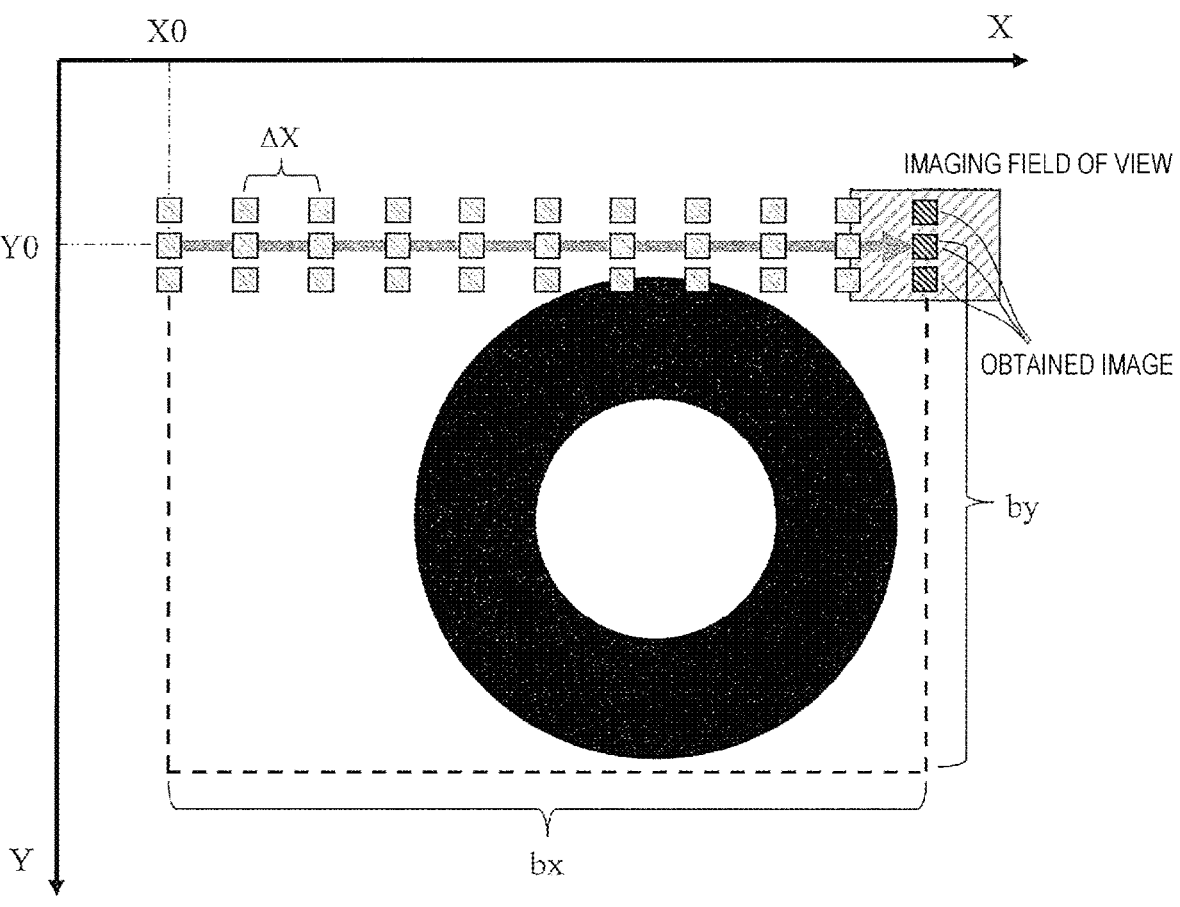
FIG. 8C is a diagram showing a modification of step S602.

FIG. 8C is a diagram showing a modification of step S602. In S602, as shown in FIG. 8C, the partial images may be obtained simultaneously on a plurality of scanning lines extending in the same direction. As a result, the scanning time can be shortened.

FIG. 9A is a diagram showing a state in which the controller 200 moves the imaging field of view by ΔY in the Y direction in step S604. This step is for moving to the next scanning line adjacent in the Y direction when the conditions (1) and (2) are not satisfied on the current scanning line in S603.

FIG. 9B is a diagram showing a state in which S602 is performed following FIG. 9A. Here, an example in which the imaging field of view is scanned in the –X direction is shown. As a result, it is not necessary to scan again in the +X direction after the imaging field of view is returned to X0, and thus the scanning time can be reduced.

Figure 9C:
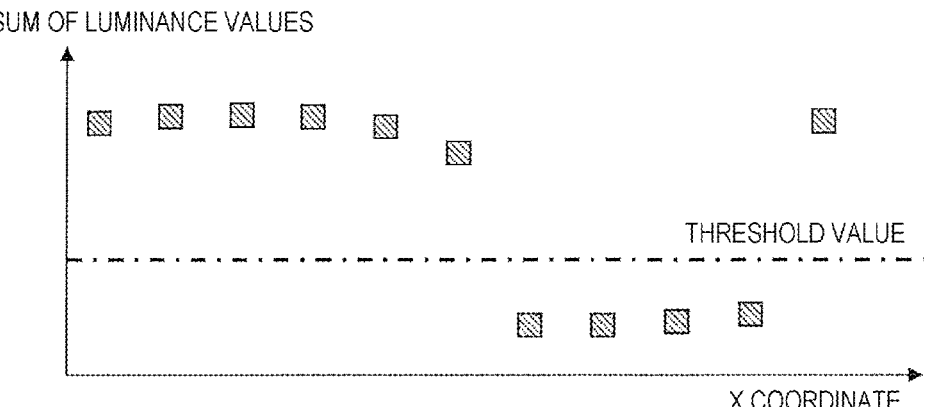
FIG. 9C is an example of a profile obtained in FIG. 9B.

FIG. 9C is an example of a profile obtained in FIG. 9B. In the profile of FIG. 9C, since there is only one low-luminance region, the condition (1) is not satisfied. Therefore, the controller 200 moves the imaging field of view by ΔY in the Y direction again in S603 and S604. Such an operation is repeated, and a region of bx×by is scanned until the condition is satisfied. In order to reliably detect the well bottom surface, ΔY is preferably set to be equal to or less than the diameter of the well bottom surface.

FIG. 10A is an example of a scanning line satisfying the conditions (1) and (2). The conditions (1) and (2) have the significance of identifying the scanning line that intersect the annular low-luminance region S and the bottom surface portion inside the low-luminance region S, respectively. When luminance values are obtained along the scanning line of FIG. 10A, a luminance value of the bottom surface portion is high, while luminance values of the low-luminance regions S on both sides thereof are low. Therefore, on the profile, the high-luminance region is interposed between the two low-luminance regions. In other words, there is one high-luminance region interposed between the two low-luminance regions.

Figure 10B:
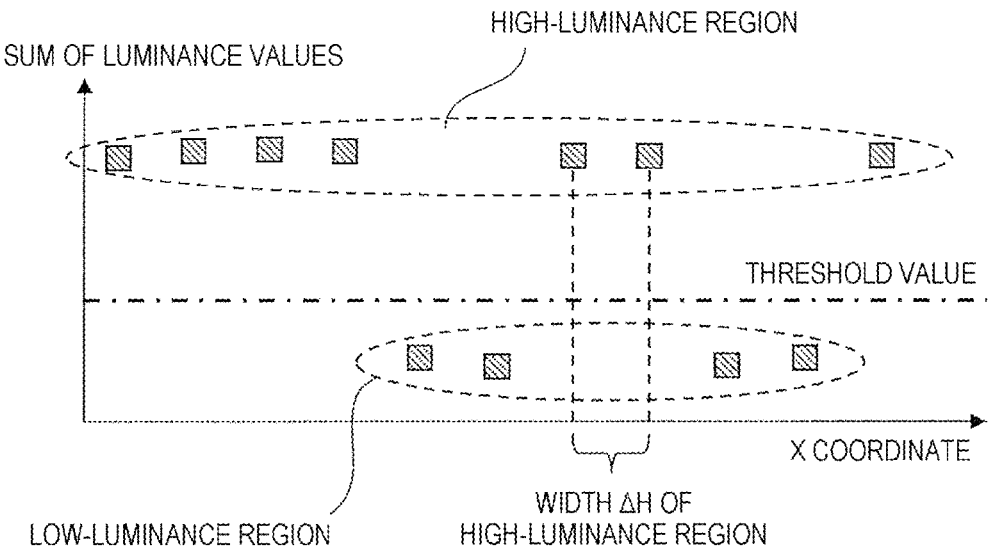
FIG. 10B is an example of a profile obtained in FIG. 10A.

FIG. 10B is an example of the profile obtained in FIG. 10A. The condition (1) can be determined by distinguishing the high-luminance region and the low-luminance region by a determination threshold value. As the determination threshold value, an appropriate value that can distinguish the well bottom surface and the region S from each other based on an actual image is set in advance. In FIG. 10B, there are two low-luminance regions. For the condition (2), the width ΔH of the high-luminance region interposed between the low-luminance regions is calculated, and it is confirmed that the width ΔH is within the allowable range.

Here, the allowable range of ΔH is set to ΔX<ΔH<(the diameter of the well bottom surface). That is, it is confirmed that the high-luminance region in the profile is continuous at two or more points, and the width is equal to or shorter than the diameter of the well bottom surface. By excluding cases where the high-luminance region includes only one point, an effect of reducing erroneous determination and increasing calculation accuracy of the central position can be achieved. If a lower limit value of the allowable range is further increased, the calculation accuracy can be expected to be improved, while the time taken until the determination is completed increases.

FIG. 11 is a diagram showing a state in which the controller 200 obtains the coordinate Xc of the actual center in step S605. Here, the same profile as that of FIG. 10B is shown. Since the high-luminance region on the profile includes two coordinate points, the controller 200 calculates the midpoint as Xc.

FIG. 12A is a diagram showing a state in which a profile is obtained along the scanning line in the Y direction in S607. An interval at which the images are obtained is assumed to be ΔY When scanning is performed in the Y direction at a location where the X coordinate is Xc, the scanning line passes through the well bottom surface interposed between the low-luminance regions S. Therefore, the scanning line at this time satisfies the conditions (1) and (2).

FIG. 12B is an example of the profile obtained in FIG. 12A. In the same manner as in FIG. 10B, the width ΔH of the high-luminance region interposed between the two low-luminance regions is calculated, and it is confirmed that the width ΔH is within the allowable range. The allowable range of ΔH is set to ΔY<ΔH<(the diameter of the well bottom surface). As in FIG. 10B, the cases where the high-luminance region includes only one point are excluded. The center point coordinate Yc can be obtained by an average value of coordinate points of the high-luminance region.

Embodiment 1: Calculation Example

Specific numerical values are used to estimate the time required for the series of operations. The diameter of the well bottom surface is 1.5 mm, ΔS is 0.5 mm, tolerance of the position of the well is ±1 mm in the X and Y directions, ax is 1.8 mm, ay is 1.7 mm, bx is 3.6 mm, by is 3.6 mm, ΔX is 0.2 mm, ΔYs is 1.2 mm, and ΔY is 0.2 mm. Assuming that an expected value of the actual central position of the well bottom surface coincides with a design central position, an average processing time is calculated.

Figure 13:
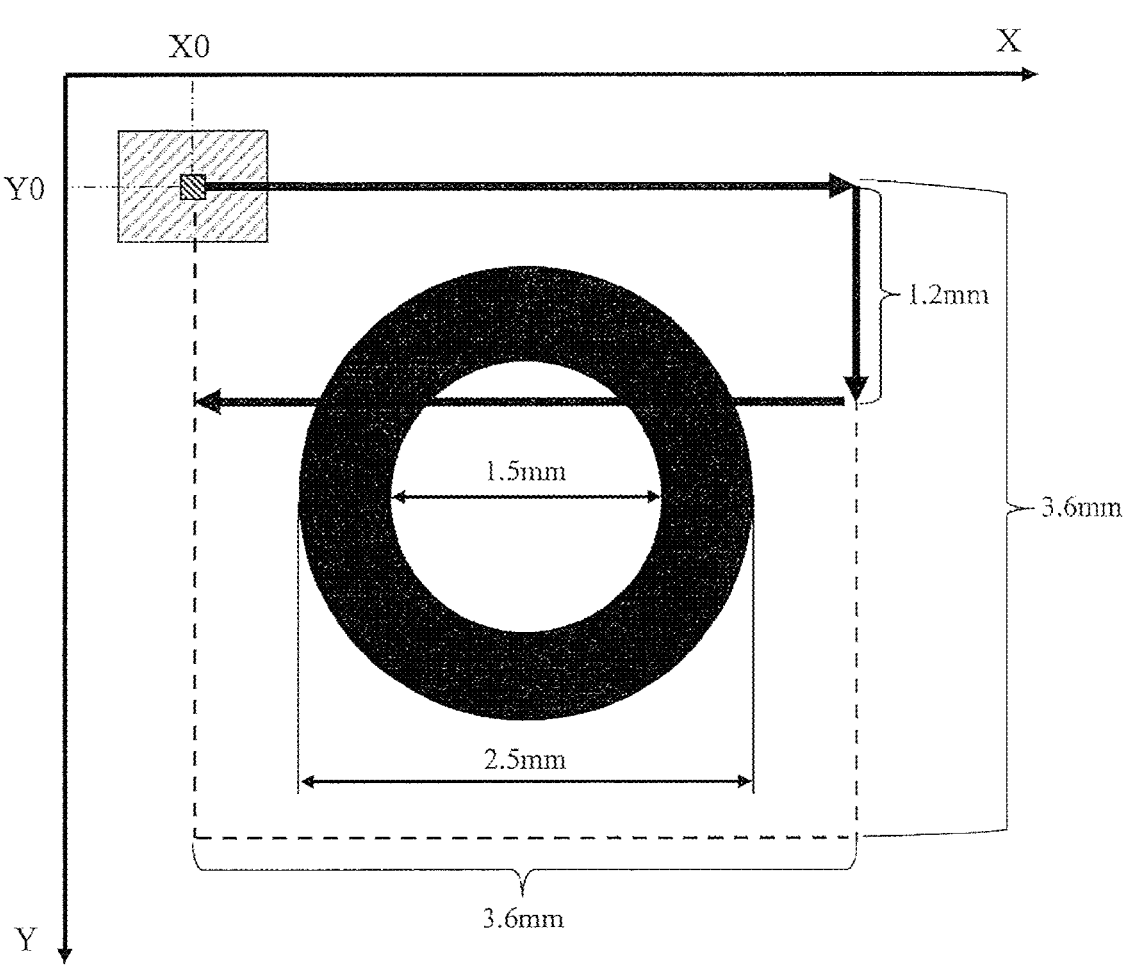
FIG. 13 is a plan view corresponding to a dimension example.

FIG. 13 is a plan view corresponding to the dimension example described above. An X-direction moving distance until Xc is calculated is 3.6 mm (bx)×2=7.2 mm. In the case of moving at an average speed of 0.69 mm/s, it takes 10.4 seconds for each movement in the X direction. Calculation of the sum of the luminance values is performed for 0.29 seconds during the ΔX movement. While moving by 1.2 mm (ΔY) in the Y direction, the moving may be performed at a relatively high speed during this time, and if it is assumed that moving is performed at an average of 20 mm/s, the time required is 0.06 seconds. After Xc is determined, a moving time from coordinates (X0, Y0+1.2) to coordinates (X0+1.8, Y0) is 0.09 seconds when X and Y simultaneously start moving at an average of 20 mm/s. Scanning in the Y direction takes 5.2 seconds, assuming that 3.6 mm is moved at an average of 0.69 mm/s. These times are summed up to obtain the required time, which is 10.4+0.06+0.09+5.2=15.75 seconds.

Embodiment 1: Summary

The specimen observation apparatus 100 according to Embodiment 1 identifies the central position (Xc, Yc) of the bottom surface of the specimen container 101 by using the number of the high-luminance regions interposed between the low-luminance regions and the width ΔH thereof, prior to performing the auto-focus of the objective lens 102. Since it is not necessary to align the focal position with a specimen surface when the central position is identified, the central position can be identified even if the specimen observation area and the imaging field of view are deviated to such an extent that the auto-focus becomes impossible. Since the defocused image is evaluated, the image can be analyzed without being affected by disturbance elements (for example, damage, scratches, or micro-cracks generated at the time of manufacturing the specimen container) present on an actual specimen observation surface. In addition, since it is not necessary to detect the shape of the bottom surface of the specimen container 101, image blur of about several pixels can be allowed. Therefore, the operation speed of the XY stage 109 can be increased relative to the exposure time, and the time required for the determination can be shortened.

Since the specimen observation apparatus 100 according to Embodiment 1 analyzes only a part of the imaging field of view as the obtained image, even if the scanning range (bx x by) is widened, an amount of data to be subjected to image processing is small, and thus an image processing time can be shortened. Therefore, image processing capacity can be kept small, which is advantageous in terms of cost.

Embodiment 2

In Embodiment 2 of the disclosure, a method of identifying the central position of the well bottom surface by detecting a position and a width of the annular low-luminance region S will be described. In Embodiment 2, the following conditions are used as the determination conditions (1) and (2). Regardless of the condition (1), the central position is an average of coordinate points in the low-luminance region. Other items, such as the configuration and the operation flow of the specimen observation apparatus 100, are the same as those of Embodiment 1.

Condition (1): in the profile, there is one or two low-luminance regions below the determination threshold value.

Condition (2): Widths $\Delta L$ of all the low-luminance regions in the profile are within a set allowable range.

Figure 14:
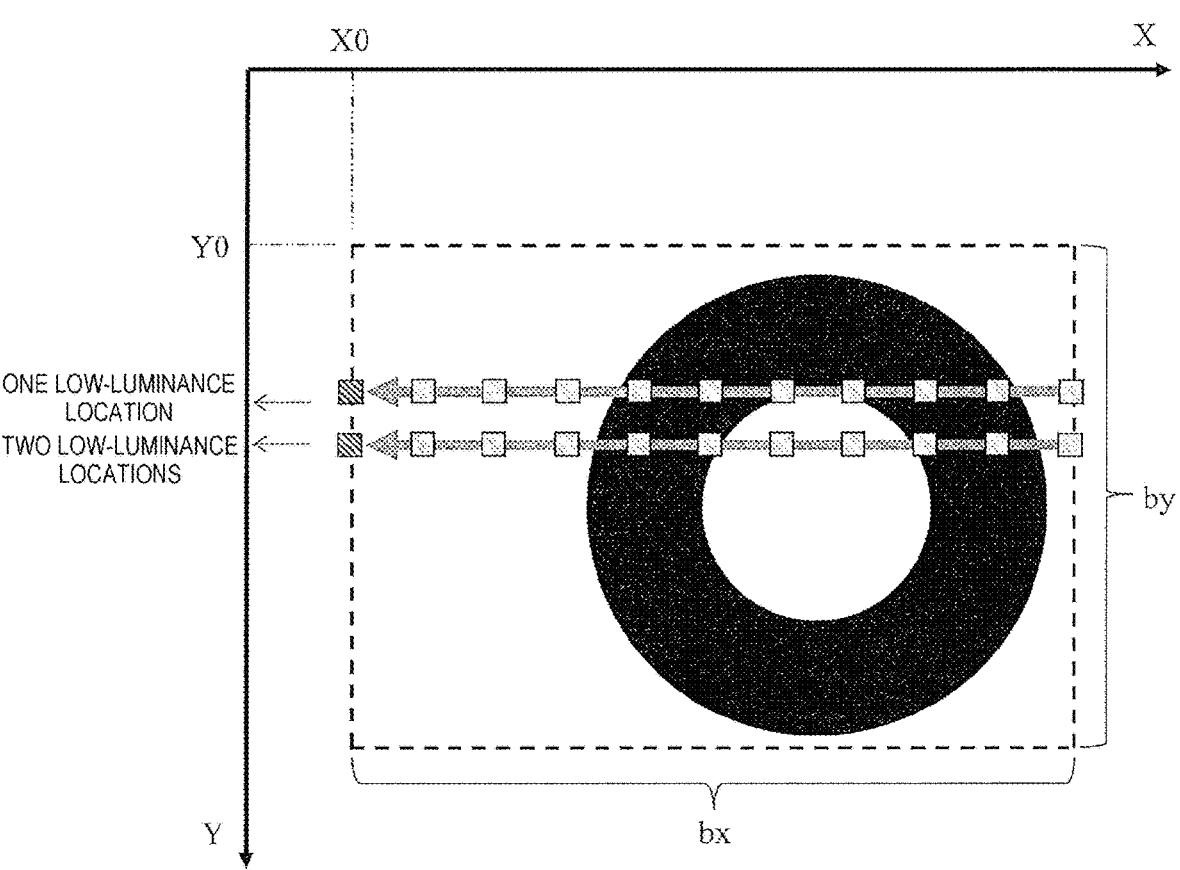
FIG. 14 is a diagram illustrating conditions (1) and (2) in Embodiment 2.

FIG. 14 is a diagram illustrating the conditions (1) and (2) in Embodiment 2. Hereinafter, the conditions (1) and (2) and the allowable range in Embodiment 2 will be described using two scanning lines shown in FIG. 14.

When there is only one low-luminance region on the scanning line (condition (1)), the scanning line passes through the low-luminance region without crossing the well bottom surface. For example, the scanning line on an upper side of FIG. 14 corresponds to this case. The allowable range of $\Delta L$ (condition (2)) is suitably equal to or higher than $\Delta X$ and equal to or less than a maximum length of the low-luminance region along the scanning line. This is because, in Embodiment 2, since the low-luminance region is detected, as the allowable range, it is necessary to set a range that is appropriate as the width of the low-luminance region. Specifically, as indicated by the scanning line on the upper side of FIG. 14, when the scanning line is in contact with an image of the well bottom surface, the length of the low-luminance region is maximized. $\Delta L$ is equal to or less than the maximum length.

When there are two low-luminance regions on the scanning line (condition (2)), the scanning line passes through the low-luminance region=>the high-luminance region (well bottom surface)=>the low-luminance region in this order. For example, the scanning line on a lower side of FIG. 14 corresponds to this case. The allowable range of $\Delta L$ (condition (2)) is suitably equal to or higher than $\Delta X$ and equal to or less than the width of the low-luminance region S (0.5 mm in the example of FIG. 4). This is because, in Embodiment 2, since the low-luminance regions are detected, as the allowable range, it is necessary to set a range that is appropriate as the width of each low-luminance region.

Embodiment 2: Summary

The specimen observation apparatus 100, according to Embodiment 2, can identify the well central position, particularly even if there is one low-luminance region under the condition (1). That is, the central position can be identified at a relatively early stage when scanning the range (bx, by) to be scanned. As a result, a distance by which the imaging field of view is moved in order to identify the central position can be shortened, which is advantageous since the central position can be identified more quickly.

Embodiment 3

In Embodiment 3 of the disclosure, a method of directly detecting the well bottom surface will be described. In Embodiment 2, the following conditions are used as the determination conditions (1) and (2). Regardless of the condition (1), the central position is an average of coordinate points in the high-luminance region. Other items, such as the configuration and the operation flow of the specimen observation apparatus 100, are the same as those of Embodiment 1.

Condition (1): in the profile, there are N high-luminance regions exceeding the determination threshold value ($N \geq 1$).

Condition (2): The width $\Delta H$ of a high-luminance region at one location on the profile is within a set allowable range, while the widths $\Delta H$ of high-luminance regions at (N−1) locations are not within the set allowable range.

In the examples of the upper scanning lines in FIGS. 10A and 14, there are three high-luminance regions (corresponding to a case where N=3 under the condition (1)). It is assumed that the width $\Delta H$ of the high-luminance region corresponding to the well bottom surface is within a design tolerance range of the well bottom surface. Therefore, it is appropriate that the allowable range of $\Delta H$ is (the design value of the diameter of the well bottom surface−a lower limit tolerance of the diameter of the well bottom surface) $< \Delta H <$ (the design value of the diameter of the well bottom surface+an upper limit tolerance of the diameter of the well bottom surface). Meanwhile, it is considered that the widths of the high-luminance regions located on an outer side relative to the low-luminance regions do not fall within the design tolerance range of the well bottom surface. Therefore, by setting the allowable range as described above, only the high-luminance region corresponding to the well bottom surface can be detected. When the diameter of the well bottom surface is 1.5 mm±0.1 mm, $1.4 \leq \Delta H \leq 1.6$.

Figure 15:
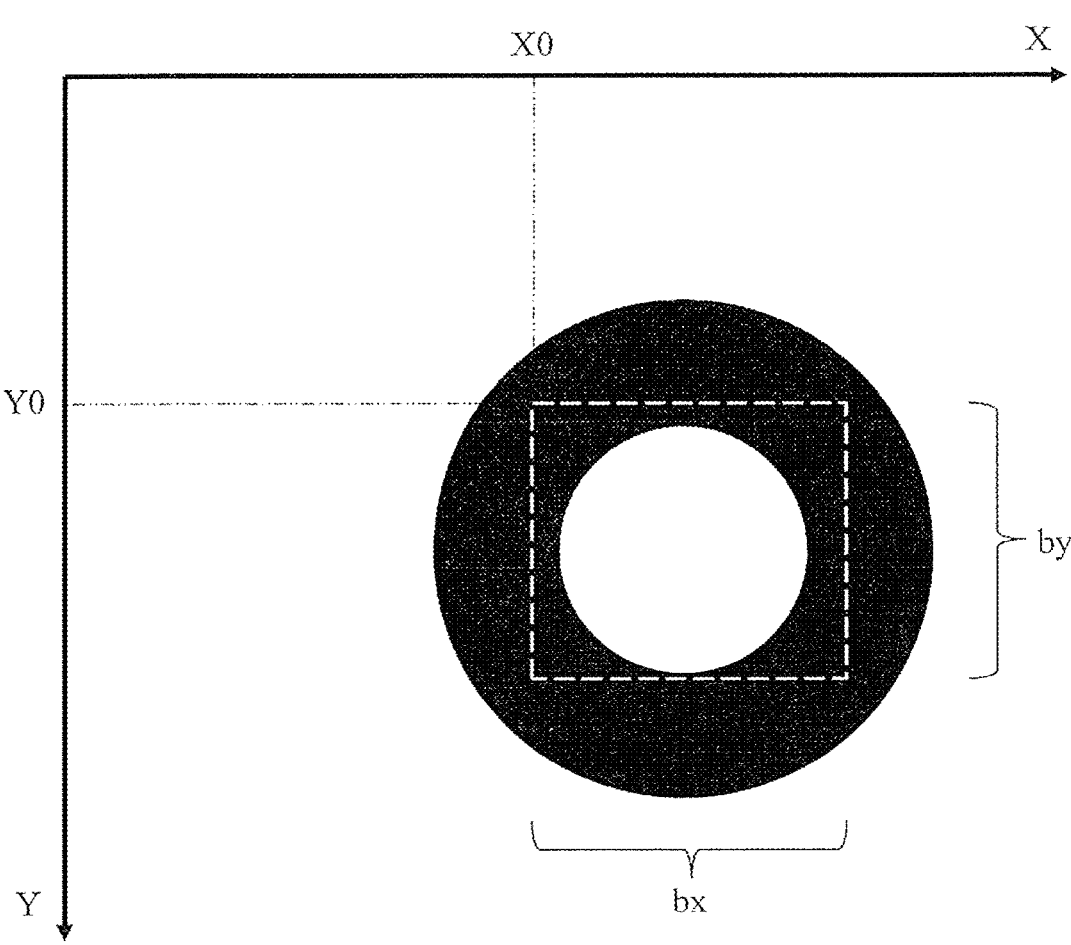
FIG. 15 shows an example of a case where a well bottom surface is directly detected when there is only one high-luminance region.

FIG. 15 shows an example of a case where the well bottom surface is directly detected when there is only one high-luminance region. Depending on the size of the range (bx, by) to be scanned, there may be a case where only one high-luminance region corresponding to the well bottom surface is included even if the entire range is scanned. FIG. 15 shows an example thereof. In this case, even if N=1 under the condition (1), if $\Delta H$ falls within the design tolerance range, the high-luminance region can be regarded as the well bottom surface.

However, this method is suitable for a case where a well position error is relatively small and a possibility of erroneous detection is small even if the range (bx, by) to be scanned is set to be small to some extent. This is because, when the well position error is large, depending on the size of the range (bx, by) to be scanned and an initial position, there is a possibility that a high-luminance region located on the outer side of the low-luminance regions is erroneously recognized as the well bottom surface.

Embodiment 3: Summary

The specimen observation apparatus 100 according to Embodiment 3 detects the high-luminance region, and distinguishes whether the high-luminance region is the well bottom surface according to the preset allowable range. As a result, the well bottom surface to be searched can be directly found, and thus a determination algorithm can become relatively simple.

Embodiment 4

In Embodiment 4 of the disclosure, an example in which the entire imaging field of view is set as an image to be obtained will be described. The configuration of the specimen observation apparatus 100 is the same as that of FIG. 1. In Embodiment 4, the conditions (1) and (2) described in Embodiments 1 to 3 are not used, and the central position of the well bottom surface is identified by the following procedure.

It is assumed that the imaging element 106 has 5 million pixels of 2500×2000, and the pixel resolution is 0.345 m/pixel. An actual field of view is 0.86 mm×0.69 mm. Each of bx and by is an integer multiple of 0.86 mm and 0.69 mm, respectively, $\Delta X$ is 0.86 mm and $\Delta Y$s is 0.69 mm. A region of bx×by is scanned to stack images. The stacked images are combined as shown in FIG. 4, and a region having a high luminance value is determined based on a preset threshold value. The well bottom surface is determined by comparing an area of the determined high-luminance-value region with an allowable area value. When the diameter of the well bottom surface is 1.5 mm±0.1 mm, an allowable area range is 1.5 mm$^2$ to 2.0 mm$^2$.

However, when the well position error is large, that is, when bx and by are large, a high-luminance region outside the well may be recognized as the well bottom surface. In this case, the well bottom surface can be determined by evaluating shape feature values such as an aspect ratio and circularity of the high-luminance-value region. A geometric center of the determined high-luminance region is calculated, and Xc and Yc are determined at the same time.

Modification of Disclosure

The disclosure is not limited to the embodiments described above, and has various modifications. For example, the embodiments described above have been described in detail for easy understanding of the disclosure, and the invention is not necessarily limited to those including all the configurations described above. In addition, a part of the configurations of one embodiment can be replaced with the configurations of another embodiment, and the configurations of the other embodiment can be added to the configurations of the one embodiment. In addition, a part of the configurations of each embodiment may be added, deleted, or replaced with other configurations.

In the embodiments described above, the controller 200 may be implemented by hardware such as a circuit device on which the functions are implemented, or may be implemented by executing software in which the functions are implemented by an arithmetic apparatus such as a central processing unit (CPU).

In the embodiments described above, the imaging element 106 may be disposed on a transmission side of the dichroic mirror 104, and the optical pickup 105 may be disposed on a reflection side. In addition, an appropriate optical component, such as an optical filter (not shown), may be disposed on the optical path.

In the embodiments described above, the focal position of the objective lens 102 is set above the well bottom surface (inside the specimen container 101). In a case where a central axis deviation between a well outer bottom surface and the well bottom surface (see FIG. 2) is small and negligible, the focal position of the objective lens 102 may be set below the well bottom surface instead of being above the well bottom surface. In this case, a defocused image of the well outer bottom surface is obtained and analyzed. A procedure for identifying the central position is the same as that of the embodiments described above.

Although the central position coordinates are determined in the order of Xc and Yc in the embodiments described above, this order may be changed.

Although it has been described in Embodiment 4 that the threshold value for determining the high-luminance region is set in advance, the threshold value may be automatically set for each observation image by using any known method of automatically setting the threshold value.

In the embodiments described above, an example has been described in which the well bottom surface is circular, and the inclined portion around the well bottom surface is also arranged concentrically relative to the well bottom surface. The well shape whose central position can be identified by the invention is not limited thereto, and the invention can also be applied to other shapes in which the low-luminance region is formed around the well bottom surface by the inclined portion. For example, when the well bottom surface and the low-luminance region around the well bottom surface are line-symmetric along the X direction (relative to the Y axis), a coordinate average of the high-luminance region or the low-luminance region can be regarded as Xc.

Similarly, in the case of being line-symmetric along the Y direction (relative to the X axis), the coordinate average of the high-luminance region or the low-luminance region can be regarded as Yc.

The embodiments described above may be used in combination. For example, it is conceivable to finally identify the central position by averaging central position coordinates identified in the case where there is only one low-luminance region under the condition (1) described in Embodiment 2 and central position coordinates identified in Embodiment 1. Alternatively, it is conceivable that a reliability coefficient may be determined in advance for each embodiment, and the central position may be finally identified by adding up results of multiplying the central position coordinates identified in each embodiment by the reliability coefficient. Other appropriate methods may be used in combination with the embodiments.

REFERENCE SIGNS LIST

100: specimen observation apparatus
101: specimen container
102: objective lens
103: objective lens actuator
104: dichroic mirror
105: optical pickup
106: imaging element
107: illumination
108: specimen container holder
109: XY stage

The invention claimed is:

1. A specimen observation apparatus configured for observing a specimen contained in a specimen container, the specimen observation apparatus comprising:

an XY stage configured to move a specimen container holder supporting the specimen container in two directions along a horizontal direction;

a light source configured to emit light in a direction perpendicular to the horizontal direction;

an objective lens configured to collect the light transmitted through the specimen container;

an imaging unit configured to capture an image of the specimen by using the light collected by the objective lens;

an auto-focus mechanism configured to adjust a focal position of the objective lens; and a controller configured to control an operation of the specimen observation apparatus, wherein the specimen container has a shape in which a bottom surface of the specimen container and a side surface of the specimen container are connected by an inclined surface, wherein the controller obtains a luminance value for the image at a plurality of locations in the specimen container, prior to adjusting the focal position by the auto-focus mechanism, and wherein the controller uses a number of a high-luminance region, in which the luminance value for the image at a plurality of locations in the specimen container is equal to or higher than a threshold value, and a width of the high-luminance region in the horizontal direction to identify a central position of the specimen container in the horizontal direction, or uses a number of a low-luminance region, in which the luminance value for the image at a plurality of locations in the specimen container is less than the threshold value, and a width of the low-luminance region in the horizontal direction to identify a central position of the specimen container in the horizontal direction.

2. The specimen observation apparatus according to claim 1, wherein the controller obtains the luminance value for the image at a plurality of locations while moving the specimen container holder along a first scanning line in the horizontal direction, wherein the controller searches for the first scanning line on which there are two or more of the low-luminance regions and a width of a high-luminance region interposed between two of the low-luminance regions is within a first allowable range, and wherein the controller uses the width of the high-luminance region on the first scanning line obtained by the searches to identify the central position in a first direction parallel to the first scanning line.

3. The specimen observation apparatus according to claim 2, wherein the controller identifies, as the central position, an average value of coordinate points of the high-luminance region on the first scanning line obtained by the searches.

4. The specimen observation apparatus according to claim 2, wherein the controller uses, as the first allowable range, a value that is equal to or greater than an interval between the respective locations along the first scanning line and equal to or less than a diameter of the bottom surface of the specimen container.

5. The specimen observation apparatus according to claim 2, wherein the controller obtains the luminance value at each of the locations while moving each of the locations along a second scanning line orthogonal to the first scanning line in the horizontal direction, wherein the controller searches for the second scanning line on which there are two or more of the low-luminance regions and a width of the high-luminance region interposed between two of the low-luminance regions is within a second allowable range, and wherein the controller uses the width of the high-luminance region on the second scanning line obtained by the search to identify the central position in a second direction parallel to the second scanning line.

6. The specimen observation apparatus according to claim 1, wherein the controller identifies a position and a width of a refracted light image obtained by imaging the light refracted by the inclined surface of the specimen container, and wherein the controller uses the position and the width of the refracted light image to identify the central position.

7. The specimen observation apparatus according to claim 1, wherein the controller obtains the luminance value at each of the locations while moving each of the locations along a third scanning line in the horizontal direction, wherein the controller searches for the third scanning line on which there are one or two of the low-luminance regions and a width of each low-luminance region is within a third allowable range, and wherein the controller uses the width of the low-luminance region on the third scanning line obtained by the search to identify the central position in a third direction parallel to the third scanning line.

8. The specimen observation apparatus according to claim 7, wherein the controller identifies, as the central position, an average value of coordinate points of the low-luminance region on the third scanning line obtained by the searches.

9. The specimen observation apparatus according to claim 7, wherein with only one low-luminance region on the third scanning line, the controller uses, as the third allowable range, a value that is equal to or greater than an interval between the respective locations along the third scanning line and equal to or less than a maximum length along which the low-luminance region is continuous without interruption in a direction along the third scanning line.

10. The specimen observation apparatus according to claim 7, wherein when there are two low-luminance regions on the third scanning line, the controller uses, as the third allowable range, a value that is equal to or greater than an interval between the respective locations along the third scanning line and equal to or less than a width of each of the two low-luminance regions.

11. The specimen observation apparatus according to claim 1, wherein the controller obtains the luminance value at each of the locations while moving each of the locations along a fourth scanning line in the horizontal direction, wherein the controller searches for the fourth scanning line on which there are two or more of the high-luminance regions and a width of one region of the high-luminance regions is within a fourth allowable range while widths of the other high-luminance regions are not within the fourth allowable range, and wherein the controller uses the width of the one region on the fourth scanning line obtained by the search to identify the central position in a fourth direction parallel to the fourth scanning line.

12. The specimen observation apparatus according to claim 11, wherein the controller uses, as the fourth allowable range, a value that is equal to or greater than a lower limit tolerance of a design value.

13. The specimen observation apparatus according to claim 1, wherein the controller identifies the central position after setting the focal position inside the specimen container, wherein the controller obtains, as the image, an image of a range narrower than an imaging field of view of the imaging unit, and wherein the controller obtains, as the image, an image of a range narrower than the bottom surface of the specimen container.

14. The specimen observation apparatus according to claim 1, wherein the bottom surface has a circular shape, and the inclined surface is formed so as to concentrically surround a periphery of the bottom surface, wherein the controller adds up luminance values of pixels in the image obtained at each of the locations to obtain the luminance value for the image at each of the locations, and wherein after identifying the central position, the controller adjusts the focal position by the auto-focus mechanism at the identified central position.

15. A specimen observation method for observing a specimen by using a specimen observation apparatus configured to observe the specimen contained in a specimen container, in which the specimen observation apparatus includes:

an XY stage configured to move a specimen container holder supporting the specimen container in two directions along a horizontal direction, a light source configured to emit light in a direction perpendicular to the horizontal direction, an objective lens configured to collect the light transmitted through the specimen container, an imaging unit configured to capture an image of the specimen container by using the light collected by the objective lens, and an auto-focus mechanism configured to adjust a focal position of the objective lens, in which the specimen container has a shape in which a bottom surface of the specimen container and a side surface of the specimen container are connected by an inclined surface, the specimen observation method comprising:

obtaining a luminance value for the image at a plurality of locations in the specimen container, prior to adjusting the focal position by the auto-focus mechanism; and identifying a central position of the specimen container in the horizontal direction, wherein identifying the central position includes:

using a number of a high-luminance region, in which the luminance value for the image at a plurality of locations in the specimen container is equal to or higher than a threshold value, and a width of the high-luminance region in the horizontal direction, to identify the central position of the specimen container in the horizontal direction, or using a number of a low-luminance region, in which the luminance value for the image at a plurality of locations in the specimen container is less than the threshold value, and a width of the low-luminance region in the horizontal direction to identify a central position of the specimen container in the horizontal direction.

* * * * *